Jan. 8, 1963  F. L. HAUSHALTER  3,071,850
METHOD OF MAKING A COMPOSITE ASSEMBLY FOR USE BETWEEN
CONCENTRIC SECTIONS OF A TORSIONAL SHAFT
Filed Aug. 18, 1960  3 Sheets-Sheet 1
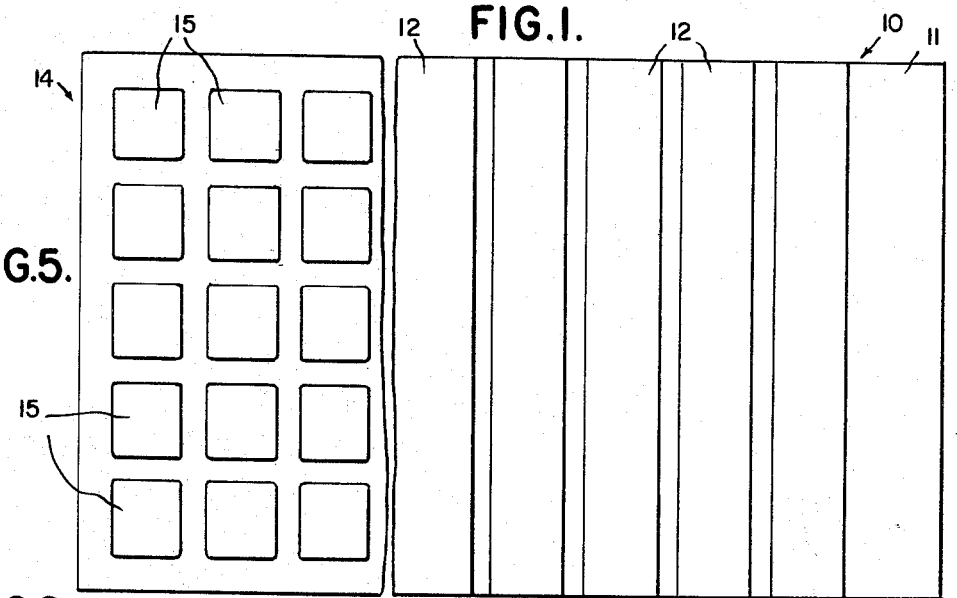
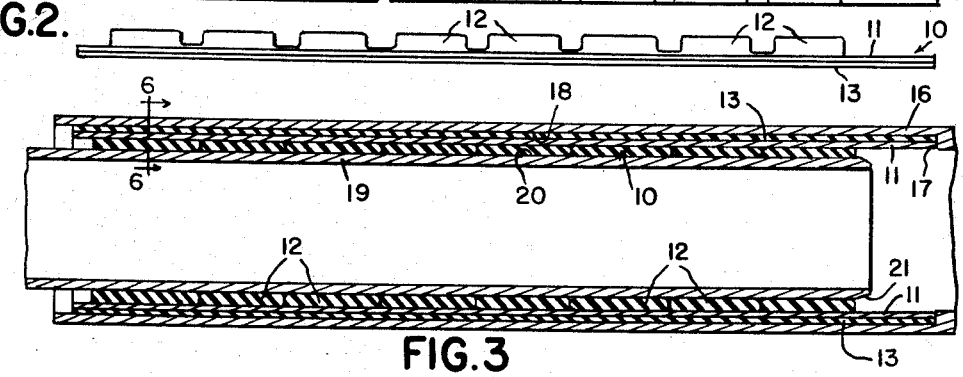
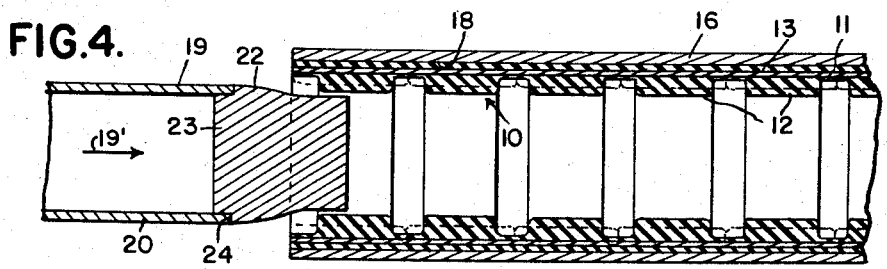
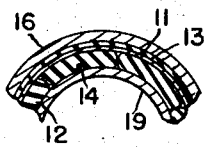
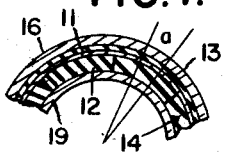
INVENTOR
FRED L. HAUSHALTER
BY Whittemore, Hulbert & Belknap
ATTORNEYS Jan. 8, 1963  F. L. HAUSHALTER  3,071,850
METHOD OF MAKING A COMPOSITE ASSEMBLY FOR USE BETWEEN
CONCENTRIC SECTIONS OF A TORSIONAL SHAFT
Filed Aug. 18, 1960  3 Sheets-Sheet 2

INVENTOR.
FRED L. HAUSHALTER
BY
*Whittemore, Hulbert & Belknap*
ATTORNEYS

Jan. 8, 1963 F. L. HAUSHALTER 3,071,850
METHOD OF MAKING A COMPOSITE ASSEMBLY FOR USE BETWEEN
CONCENTRIC SECTIONS OF A TORSIONAL SHAFT
Filed Aug. 18, 1960 3 Sheets-Sheet 3
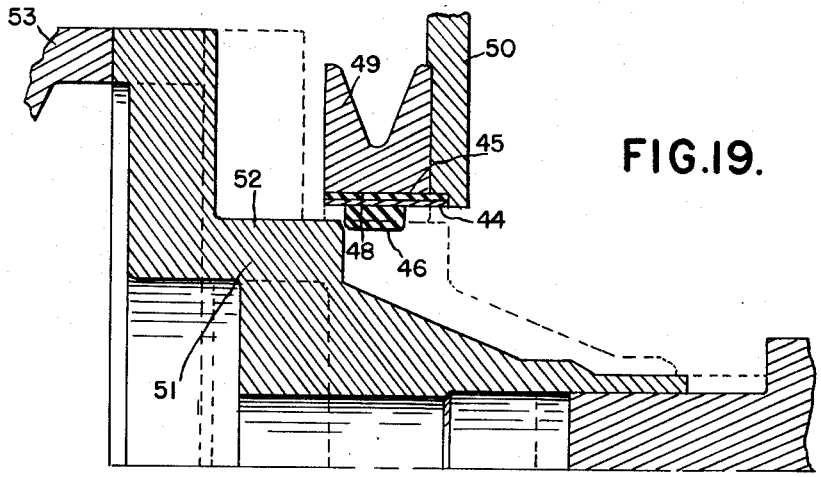
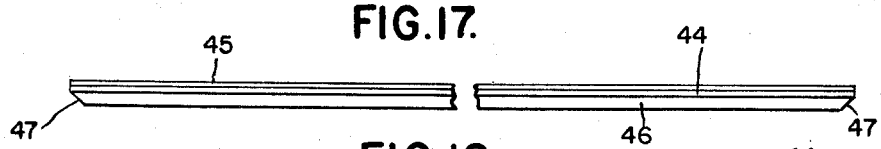
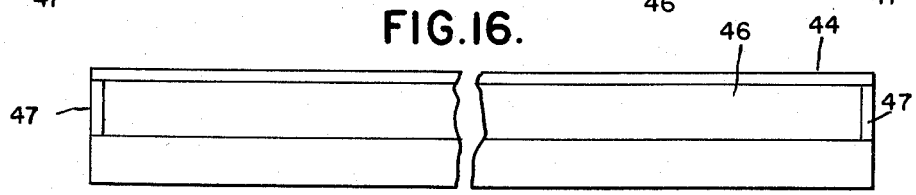
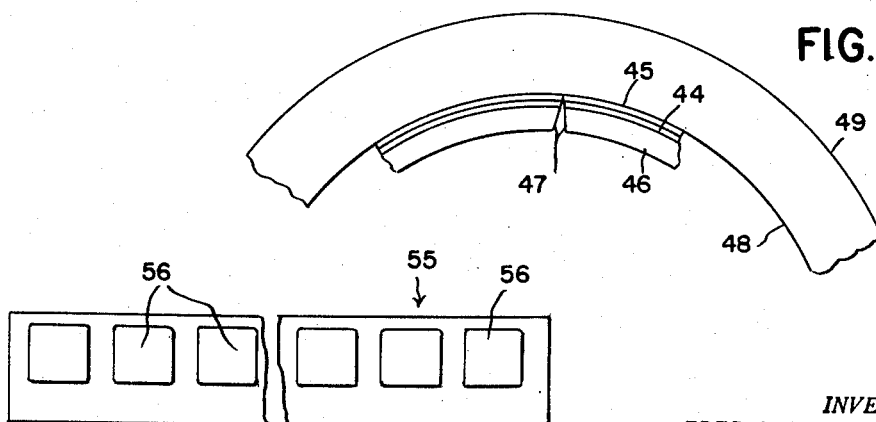
INVENTOR.
FRED L. HAUSHALTER
BY
Whittemore, Hulbert & Belknap
ATTORNEYS United States Patent Office 3,071,850
Patented Jan. 8, 1963

3,071,850
METHOD OF MAKING A COMPOSITE ASSEMBLY FOR USE BETWEEN CONCENTRIC SECTIONS OF A TORSIONAL SHAFT
Fred L. Haushalter, 2185 Scott Lake Road, Pontiac, Mich.
Filed Aug. 18, 1960, Ser. No. 50,448
3 Claims. (Cl. 29—450)

This invention relates generally to a composite assembly for use between concentric sections of a torsional shaft or vibration damper and method of making the same, and refers more particularly to a composite assembly disposed within the annular space between the opposed concentric cylindrical surfaces of the spaced apart relatively rotatable, inner and outer members or sections of a torsional shaft or vibration damper.

This application constitutes a continuation-in-part of my application filed May 2, 1960, and bearing Serial No. 26,210, now Patent No. 3,041,889, which is now a division of my prior application filed January 26, 1959, and bearing Serial No. 789,027, now patent 2,977,819.

One of the essential objects of the invention is to provide a composite assembly for use between the relatively rotatable members of a torsional shaft or vibration damper wherein the composite assembly is preformed before being assembled with the members.

Another object is to provide a method of making a torsional shaft or vibration damper having a composite metal-rubber assembly in the space between the relatively rotatable inner and outer members, wherein the composite assembly is formed flat, rolled to tubular shape, inserted into the outer member, and the inner member is then inserted in an endwise direction to compress the rubber.

Another object is to provide a composite assembly so formed that it may be quickly and easily assembled with the relatively rotatable members.

Another object is to provide a composite assembly which includes a metal sheet or strip having a plurality of slabs or one or more strips of elastic material bonded to one surface and a relatively thin coating of elastic material bonded to the opposite surface.

Another object is to provide a composite assembly which serves as the sole means for effecting a yieldable connection between the relatively rotatable inner and outer members.

Another object is to provide a composite assembly wherein the combined overall cross-sectional thickness of the metal strip and elastic material bonded to opposite surfaces thereof is greater than the radial width of the annular space between the relatively rotatable inner and outer members, whereby the elastic material is under compression between the inner and outer members.

Other objects, advantages, and novel details of construction of this invention will be made more apparent as this description proceeds, especially when considered with the accompanying drawings, wherein:

FIGURE 1 is a plan view of the initial form of a composite assembly or insert, before assembly with the sections of a torsional shaft.

FIGURE 2 is an edge view of the insert shown in FIGURE 1.

FIGURE 3 is a longitudinal sectional view of a torsional shaft having the insert of FIGURES 1 and 2 disposed in the space between the shaft sections.

FIGURE 4 is a view similar to FIGURE 3 but shows the parts in an intermediate stage of assembly.

FIGURE 5 is a fragmentary plan view of a modified insert.

FIGURE 6 is a fragmentary sectional view taken on the line 6—6 of FIGURE 3, showing a slab type insert.

FIGURE 7 is similar to FIGURE 6 but shows the inner and outer tubes relatively rotated.

FIGURE 16 is a top plan view of the initial form of another modified insert, for use in a vibration damper.

FIGURE 17 is an edge view of the insert shown in FIGURE 16.

FIGURE 18 is a fragmentary edge view of the insert after it has been snapped into the outer one of the relatively rotatable members.

FIGURE 19 is a fragmentary sectional view of the insert and concentric members prior to forced insertion of the inner member, the inner member being shown in assembled position in dotted lines.

FIGURE 20 is a top plan view of the initial form of an insert like that of FIGURE 16 but having a modified construction.

Figure 9:
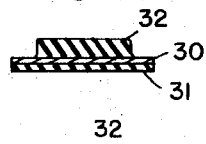
FIGURE 9 is a sectional view on the line 9—9 of FIGURE 8.

In FIGURES 1 and 2 it will be seen that the insert 10 initially comprises a flat rectangular metal sheet 11, preferably steel, to one side of which are bonded a plurality of spaced, parallel shaped resilient elements or strips 12 formed from rubber or other curable elastomer. These elements are securely bonded to the metal sheet by curing the elements to the sheet. By bonding the rubber to a thin flat steel sheet, the pressure of vulcanization is at right angles to the plane of the metal, or directly down on the metal, so that a good bond is obtained. A relatively thin coating 13 of elastic material such as rubber is bonded to the opposite surface of the sheet 11. The coating 13 may be sprayed on, or it may be a sheet of rubber bonded to the metal by curing directly thereto. The coating covers the entire surface of the metal sheet.

In FIGURE 5, an insert 14 is shown which differs from insert 10 only in that instead of the spaced parallel strips of rubber, spaced parallel rows of spaced individual slabs 15 are bonded to the flat metal sheet. The opposite surface is provided with a coating like the coating 13 for insert 10.

With respect to both inserts 10 and 14, there will be a thin film of rubber over the metal between the elements 12 or 15. However, this is incidental and is the result of flow from the elements during curing.

After the rubber strips or slabs and coating have been bonded to the flat metal sheet, the combined rubber and metal insert is bent to circular form with the rubber elements on the inside of the circle, and inserted into the tube 16 against shoulder 17. The insert 10 is shown in FIGURES 3 and 4, although the insert 14 will have the same appearance in longitudinal section and is inserted in the same way. The inner tube 19 is then inserted axially within the outer tube and insert in the direction of the arrow 19' to the final assembled position of FIGURE 3. In the final assembled position, the outer cylindrical surface 20 of the inner tube and the inner surface 18 of the outer tube are concentric and define an annular space which is of less radial width than the combined cross-sectional thickness of the rubber elements, metal sheet and coating making up the insert 10 or 14. Accordingly, the wall of the rubber elements 12 or 15 will be compressed about 40% to 50% of their original height of section when the assembly is completed. The rubber coating 13 frictionally engages the cylindrical inner surface 18 of the outer tube and may, as stated, be very thin since its primary purpose is to prevent slip.

The inner tube may have an annular bevel 21 at one end to facilitate insertion, or as an alternative, a tapered pilot 22 may be employed for this purpose. The pilot 22 has a reduced end 23 adapted to enter the inner tube which defines a shoulder 24 engageable with the tube end. The pilot is removed after assembly. FIGURE 4 shows the rubber elements in solid lines before insertion of the inner tube, and in dotted lines after insertion thereof.

Since the radial width of the space between the tubes is less than the thickness of the insert, the rubber elements 12 or 15 will be stretched a substantial amount and placed under tension as the inner tube is inserted. At the same time the rubber elements tend to assume their original form and therefore they will also be under compression. The tendency of the rubber elements to assume their original form effects an intimate frictional engagement between the rubber elements 12 or 15 and the inner tube, and between the coating 13 and the outer tube.

The tubes 16 and 19 are concentric sections of a torsional shaft, such as the propeller shaft of a motor vehicle.

When the insert 10 having continuous rubber strips is employed, the torsional rate in inch-pounds per degree is substantially constant; that is, the relative rotation between the members 16 and 19 is nearly proportional to the torque, so that a plot of angle against torque would produce substantially a straight line. However, if the insert 14 having rows of spaced slabs is used and the slabs are properly spaced circumferentially, when the members 16 and 19 are rotated relatively the torsional rate will be fairly constant through a specified angle and then the rubber will stiffen up and the torsion rate will increase substantially as the gap between the slabs closes.

Referring to FIGURE 6, the inner and outer members are shown with no torque applied, and the insert is of the type in which the rubber elements are in the form of spaced slabs. With no torque applied, the slabs barely touch. When the inner and outer members are relatively rotated, the torsion rate is initially constant so that torque is proportional to the angle, but when a specified angle "a" is reached, the gap between the slabs closes, as in FIGURE 7, and the torsional rate thereafter increases markedly due to the fact that the rubber stiffens and acts much like a continuous strip.

Figure 8:
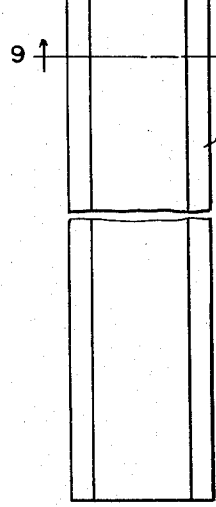
FIGURE 8 is a fragmentary plan view of the initial form of a modified form of insert, for use in a vibration damper.

Referring now to FIGURES 8 and 9, a modified insert is shown which initially comprises a flat rectangular metal strip 30, likewise preferably of steel, to one side of which is bonded a continuous, relatively thin coating 31 formed from an elastic material such as rubber for example. The coating may be sprayed on or applied in sheet form and bonded directly to the metal by curing, as with the inserts described above. To the other side of the metal strip 30 is bonded a substantially thicker elongated resilient strip 32 of rubber or like material which extends from one end of the metal strip to the other. This rubber strip is securely bonded to the metal strip by curing, as was the case with the inserts previously described. The rubber coating 31 covers the entire surface of the metal strip 30 and the edges thereof are flush with the edges of the metal strip. The rubber strip 32 is narrower than the metal strip and the edges of the rubber strip 32 are spaced inwardly equal distances from the edges of the metal strip.

Figure 11:
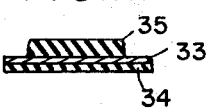
FIGURE 11 is a sectional view on line 11—11 of FIGURE 10.
Figure 10:
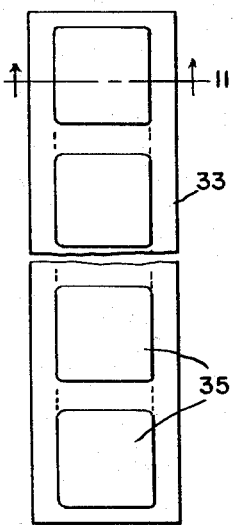
FIGURE 10 is a fragmentary view of the initial form of another modified form of insert, for use in a vibration damper.

In FIGURES 10 and 11 another form of insert is illustrated which initially comprises a flat rectangular metal strip 33, also preferably of steel, to one side of which is bonded a continuous, relatively thin coating formed from an elastic material such as rubber for example. The coating may be applied in the same manner as in FIGURES 8 and 9. Bonded to the other side of the metal strip are a plurality of individually shaped resilient elements or slabs 35 which are substantially thicker than the coating 34 and spaced apart along the length of the metal strip and formed from rubber or other curable elastomer. The slabs 35 are securely bonded to the metal strip by curing, as with the inserts previously described. The coating 34 covers the entire surface of the metal strip and its edges extend flush with the edges of the metal strip. The slabs 35 are narrower than the metal strip and are centered thereon so that the space between the slabs and both edges of the metal strip are equal. The dotted lines between the slabs indicate that continuous strips of rubber may also be employed.

Figure 13:
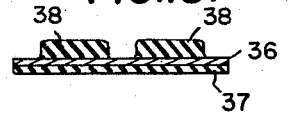
FIGURE 13 is a sectional view on line 13—13 of FIGURE 12.
Figure 12:
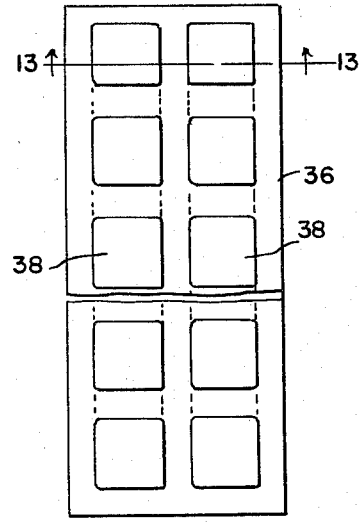
FIGURE 12 is a fragmentary view of the initial form of another modified form of insert, for use in a vibration damper.

Another modified form of insert is shown in FIGURES 12 and 13 which initially comprises a flat rectangular metal strip 36, also preferably of steel, to one side of which is bonded a continuous, relatively thin coating 37 formed from elastic material such as rubber for example, applied in the same manner as in FIGURES 8 and 9. Bonded to the other side of the metal strip 36 are two rows of individually shaped resilient elements or slabs 38 formed from rubber or other curable elastomer which are substantially thicker than the coating. The resilient slabs 38 in the two rows are respectively laterally opposed to one another, as shown. The coating 37 covers the entire surface of the metal strip and its edges extend flush with those of the metal strip. The space between the edges of the metal strip and the adjacent row of slabs are equal, and the space between the longitudinal center line of the metal strip and the two rows are equal. The slabs 38 are bonded to the metal strip by curing, as was the case with the inserts previously described. The dotted lines between the slabs indicate that continuous strips of rubber may also be used.

Figure 14:
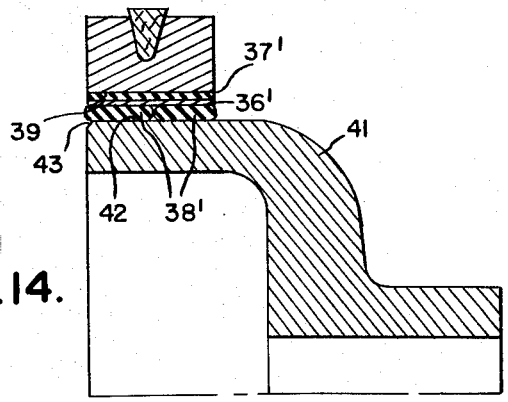
FIGURE 14 is a fragmentary sectional view of a vibration damper having an insert similar to that shown in FIGURES 12 and 13.
Figure 15:
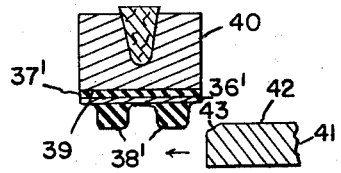
FIGURE 15 is a sectional view of portions of FIGURE 14 in an initial stage of assembly.

The insert shown in FIGURES 14 and 15 is substantially the same as that shown in FIGURES 12 and 13, although it is somewhat narrower and the slabs or strips are slightly thicker. Hence, the same reference numerals, followed by a prime are employed to identify the parts. FIGURE 14 shows the insert in assembled relation with an inertia member 40 and hub 41 of a vibration damper.

The inserts shown in FIGURES 8–15 are designed primarily for vibration dampers, as will appear more fully below.

After the coating and slabs have been bonded to the flat metal strip 36', the combined metal and rubber insert is bent to circular form with the rubber elements on slabs on the inside of the circle. In this form, the combined metal and rubber insert is snapped within the cylindrical surface 39 of the inertia member 40. The hub 41 has a cylindrical surface 42 of sufficiently smaller diameter than the cylindrical surface 39 of the inertia member 40 to provide an annular space when the hub is inserted within the inertia member in concentric relation thereto. The radial width of the space between the concentric surfaces 39 and 42 is less than the combined or overall radial thickness of the metal and rubber insert including the metal strip 36', coating 37', and any of the resilient strips or slabs 38'.

In order to complete the assembly of the vibration damper, the hub 41 is moved axially with respect to the inertia member, as shown in FIGURE 15, and pressed into the assembled position shown in FIGURE 14. To facilitate the entry of the hub, its leading end is beveled at 43.

When the combined metal and rubber insert is bent into a circle from the straight position in which the rubber was cured, the rubber section is immediately put into compression radially. Then, when the hub is pressed in, the rubber section is further compressed radially and there is some movement of the rubber in the direction of the pusher, shown by the arrow in FIGURE 15, part of which is recovered when the pressure of pushing is released. When two rows of slabs are cured on one metal back as shown in FIGURES 12-15, for use on dampers of widths greater than 5/8" to 3/4", the two rows of slabs allow much better equalization of stress in the rubber in the direction of push. The stretch-in process of my prior Patent No. 2,795,036 does not enable proper equalization of stretch in the rubber on wide section dampers because of the void taken up by the blade as it is retracted. This may cause problems of instability of the inertia member, producing so-called run-out, particularly where there is a groove in the inertia member for a V-belt, as shown in FIGURES 14 and 15, to drive a cooling fan. The bonded strip process described herein will eliminate this instability because of the stress equalization in the rubber on the wider dampers.

The rubber coating is very thin and is provided to frictionally engage the cylindrical surface 39 without slip. The rubber of the strips or slabs 38' is substantially compressed, as will be apparent from FIGURES 14 and 15, to about 40% of its original height.

The combined rubber and metal insert shown in FIGURES 12 and 13 is substantially the same as that shown in FIGURES 14 and 15, although dimensionally somewhat different, and may be installed in the same way.

Referring now to FIGURES 16 and 17, another form of insert is shown initially comprising a flat rectangular metal strip 44, preferably of steel, to one side of which is bonded a continuous, relatively thin coating 45 of rubber or similar elastic material, applied as in FIGURES 8 and 9. The coating covers the entire surface. To the other side of the metal strip is bonded an elongated, continuous, resilient strip 46 of rubber or other curable elastomer which is substantially thicker than the coating 45 and extends from one end of the metal strip to the other but which is substantially narrower than the metal strip and is disposed closer to one edge than the other. The rubber strip 46 is beveled at the ends as indicated at 47. The rubber strip 46 is bonded securely to the metal strip by curing directly to the strip, as in the other embodiments.

After the coating and rubber strip have been bonded to the flat metal strip, the combined rubber and metal insert is bent to circular form as seen in FIGURE 18 and snapped within the cylindrical inner surface 48 of the inertia member 49. The beveled ends of the rubber strip 46 allow for butting the ends of the metal strip perfectly when bent and inserted into the inertia member. While this is the preferred construction, it is within the scope of the invention to provide a gap at the ends of the metal strip when bent to circular form or to terminate the ends of the rubber strip 46 short of the ends of the metal strip, in either event making it unnecessary to bevel the ends of the rubber strip 46.

As shown in FIGURE 19, a fixture 50 is provided for supporting the inertia member 49 during assembly with the hub 51. The fixture 50 supports the inertia member 49 with respect to the hub so that the cylindrical surfaces 48 and 52 thereof are maintained in concentric relation. The surface 52 is of smaller diameter than the surface 48 to provide an annular space after assembly. The hub 51 is then pushed axially with respect to the inertia member by the pusher 53 to the dotted line position in which the surface 52 is disposed within the surface 48 of the hub and the insert is compressed within the space. In this connection, the radial width of the space between surfaces 48 and 52 is less than the combined or overall cross-sectional thickness of the rubber and metal strips forming the yieldable insert.

When the combined rubber and metal insert is bent into a circle from the straight position in which the rubber was cured, the rubber section is immediately put into compression radially. Then, when the hub is pressed in, the rubber section is further compressed radially. The thicker rubber strip 46 will be compressed about 40% when installed.

The illustration shown in FIGURE 19 may be considered as showing the manner of assembling a vibration damper having a yieldable connection or insert constructed as illustrated either in FIGURES 8 and 9 or in FIGURES 10 and 11, since the inserts shown in those figures appear in cross-section exactly as the insert shown in FIGURES 16 and 17.

The coatings on the inserts of FIGURES 8-17 are very thin and are provided to frictionally engage the inner surface of the outer member without slip. In each instance, the thick rubber on the inside of the insert is substantially compressed.

FIGURE 20 shows an insert 55 which is exactly like insert shown in FIGURE 16 except that instead of a continuous strip of rubber, individual slabs 56 are bonded to one surface. This insert is assembled with the members 49 and 51 in the same way.

While the bonding of the rubber elements to the metal strip has been described as being effected by curing the rubber to the metal, the rubber may be adhered to the metal by other suitable methods such as by adhesives. The preferred initial step is one in which the rubber elements are bonded to a flat metal strip which is subsequently bent to circular form, but it is within the concept of the invention to bond the rubber to a preformed continuous metal band. Other modifications within the terms of the claims are also contemplated. It will also be understood that in each of the modifications described, the rubber elements may be lubricated to facilitate the entry of the inner member during assembly.

In the embodiments described above where the rubber elements are continuous strips, the torsional rate in inch-pounds per degree is substantially constant; that is, the number of degrees of relative rotation between the inner and outer members is nearly proportional to the torque in inch-pounds. In those embodiments where individual slabs of rubber are employed and arranged to provide the proper circumferential spacing, when the inner and outer members are twisted or rotated relatively, the torsional rate will be fairly constant through a specified angle and then the rubber will stiffen up or increase markedly as the gap between the slabs closes.

What I claim as my invention is:

1. The method of making a torsion unit having spaced apart inner and outer relatively rotatable members provided with opposed cylindrical surfaces concentric with the axis of rotation of said members, and having a yieldable connection between said rotatable members disposed within the annular space between said opposed cylindrical surfaces; comprising the steps of providing a relatively thin, flat, straight, flexible metal strip having free ends, vulcanizing relatively thick spaced rubber slabs on one surface of said flat strip in a row extending from one end of said strip to the other and vulcanizing a relatively thin rubber layer on the opposite surface of said flat strip to form a composite unit having a cross-sectional thickness in the free state of the rubber substantially greater than the radial width of the annular space between the opposed cylindrical surfaces of said rotatable members, bending said composite unit in the arc of a circle so that the opposite free ends of said strip are positioned adjacent each other in confronting relation and said slabs are on the inside of the arc to provide a substantially annular structure in which the rubber is prestressed and said slabs are in circumferentially spaced relation to each other and project radially inwardly from said strip, inserting said substantially annular structure edgewise within said outer member in concentric relation therewith, and then forcing said inner member axially within said substantially annular structure in concentric relation therewith, whereby the rubber of said slabs is axially stretched and tensioned and flows circumferentially into the spaces between said slabs and said substantially annular structure is placed between and in concentric relation with said opposed cylindrical surfaces with said rubber slabs radially compressed in tight frictional engagement with the cylindrical surface of said inner member and said rubber layer in tight frictional engagement with the cylindrical surface of said outer member.

2. The method of making a torsion unit having spaced apart inner and outer relatively rotatable members provided with opposed cylindrical surfaces concentric with the axis of rotation of said members, and having a yieldable connection between said rotatable members disposed within the annular space between said opposed cylindrical surfaces; comprising the steps of providing a relatively thin, flat, straight, flexible metal strip having free ends, vulcanizing relatively thick rubber slabs on one surface of said flat strip in a plurality of rows extending from one end of said strip to the other in laterally spaced relation with the slabs in each row spaced from each other and vulcanizing a relatively thin rubber layer on the opposite surface of said flat strip to form a composite unit having a cross-sectional thickness in the free state of the rubber substantially greater than the radial width of the annular space between the opposed cylindrical surfaces of said rotatable members, bending said composite unit in the arc of a circle so that the opposite free ends of said strip are positioned adjacent each other in confronting relation and said slabs are on the inside of the arc to provide a substantially annular structure in which the rubber is prestresssed and the slabs in each row are in circumferentially spaced relation to each other and project radially inwardly from said strip, inserting said substantially annular structure edgewise within said outer member in concentric relation therewith, and thereafter forcing said inner member axially within said substantially annular structure in concentric relation therewith, whereby the rubber of said slabs is axially stretched and tensioned and flows circumferentially into the spaces between said slabs and said substantially annular structure is placed between and in concentric relation with said opposed cylindrical surfaces with said rubber slabs radially compressed in tight frictional engagement with the cylindrical surface of said inner member and said rubber layer in tight frictional engagement with the cylindrical surface of said outer member.

3. The method defined in claim 2, wherein the rubber layer completely covers the said opposite surface of said strip.

References Cited in the file of this patent

UNITED STATES PATENTS

| | | |
|---|---|---|
| 2,361,139 | White et al. | Oct. 24, 1944 |
| 2,426,132 | Williams | Aug. 19, 1947 |
| 2,550,564 | Hutton | Apr. 24, 1951 |
| 2,572,215 | Swart | Oct. 23, 1951 |
| 2,647,556 | Courtney | Aug. 4, 1953 |
| 2,723,706 | Carter | Nov. 15, 1955 |
| 2,763,055 | Hardy | Sept. 18, 1956 |
| 2,795,036 | Haushalter | June 11, 1957 |
| 2,949,021 | Charlesworth | Aug. 16, 1960 |

FOREIGN PATENTS

| | | |
|---|---|---|
| 794,994 | France | Dec. 26, 1935 |